United States Patent
Weiss et al.

(10) Patent No.: US 12,406,355 B2
(45) Date of Patent: Sep. 2, 2025

(54) SYSTEM AND METHOD FOR TRACING COMPONENTS OF ELECTRONIC ASSEMBLY

(71) Applicant: CYBORD LTD., Tel Aviv (IL)

(72) Inventors: Eyal Isachar Weiss, Bnei Reem (IL); Zeev Efrat, Ramat Hasharon (IL)

(73) Assignee: CYBORD LTD, Tel Aviv (IL)

( * ) Notice: Subject to any disclaimer, the term of this patent is extended or adjusted under 35 U.S.C. 154(b) by 385 days.

(21) Appl. No.: 18/009,999

(22) PCT Filed: Jun. 10, 2021

(86) PCT No.: PCT/IL2021/050708
§ 371 (c)(1),
(2) Date: Dec. 13, 2022

(87) PCT Pub. No.: WO2021/250679
PCT Pub. Date: Dec. 16, 2021

(65) Prior Publication Data
US 2023/0237642 A1    Jul. 27, 2023

Related U.S. Application Data

(60) Provisional application No. 63/038,757, filed on Jun. 13, 2020.

(51) Int. Cl.
*G06T 7/00* (2017.01)
*G06T 7/73* (2017.01)
*G06V 10/764* (2022.01)

(52) U.S. Cl.
CPC .............. *G06T 7/001* (2013.01); *G06T 7/74* (2017.01); *G06V 10/764* (2022.01);
(Continued)

(58) Field of Classification Search
CPC . G06T 7/001; G06T 7/74; G06T 2207/30141; G06T 2207/30148; G06V 10/764; G06V 2201/06
See application file for complete search history.

(56) References Cited

U.S. PATENT DOCUMENTS

| | | |
|---|---|---|
| 5,751,910 A | 5/1998 | Byrant |
| 6,023,663 A | 2/2000 | Kim |
| (Continued) | | |

FOREIGN PATENT DOCUMENTS

| | | |
|---|---|---|
| CN | 108665072 | 10/2018 |
| EP | 1212606 | 6/2022 |
| (Continued) | | |

OTHER PUBLICATIONS

International Search Report dated Aug. 25, 2021 for Corresponding International application PCT2021050708 filed Jun. 10, 2021.
(Continued)

*Primary Examiner* — Pinalben Patel
(74) *Attorney, Agent, or Firm* — A.C. Entis-IP Ltd; Allan C. Entis

(57) ABSTRACT

A system and a method for tracing components of an electronic assembly. The method may include obtaining an image of a component of the electronic assembly, generating identification information of the component based on visual features of the component, authenticating the component based on the identification information, generating correlating information by associating the component to an electronic assembly and classifying the component to a group based on the visual features of the component.

18 Claims, 6 Drawing Sheets

(52) U.S. Cl.
CPC ............... *G06T 2207/30141* (2013.01); *G06T 2207/30148* (2013.01); *G06V 2201/06* (2022.01)

(56) References Cited

U.S. PATENT DOCUMENTS

| | | | |
|---|---|---|---|
| 7,250,750 B2 * | 7/2007 | Apps ..................... | B65G 43/08 |
| | | | 29/759 |
| 9,410,898 B2 * | 8/2016 | Ikushima ............... | G06V 10/987 |
| 2004/0143352 A1 | 7/2004 | Gyorfi et al. | |
| 2006/0173654 A1 | 8/2006 | Apps et al. | |
| 2011/0102575 A1 | 5/2011 | Case et al. | |
| 2013/0284803 A1 | 10/2013 | Wood et al. | |
| 2014/0281954 A1 | 9/2014 | Ullrich et al. | |
| 2015/0078518 A1 * | 3/2015 | Tziazas ................... | G06T 7/001 |
| | | | 378/53 |
| 2015/0339862 A1 * | 11/2015 | Skaaksrud ............. | G06Q 10/08 |
| | | | 382/101 |
| 2016/0088264 A1 | 3/2016 | Freeze | |
| 2016/0282394 A1 | 9/2016 | House et al. | |
| 2017/0032285 A1 * | 2/2017 | Sharma .................. | G06N 20/00 |
| 2017/0330201 A1 | 11/2017 | Shaapur et al. | |
| 2018/0031449 A1 | 2/2018 | Cloake | |
| 2019/0213733 A1 * | 7/2019 | Yati ....................... | G06T 7/0006 |
| 2020/0068759 A1 | 2/2020 | Cvijetinovic et al. | |
| 2020/0082546 A1 | 3/2020 | Cui et al. | |
| 2020/0090003 A1 | 3/2020 | Marques et al. | |
| 2020/0294505 A1 | 9/2020 | Shen et al. | |
| 2020/0356741 A1 | 11/2020 | Principato | |
| 2020/0364817 A1 | 11/2020 | Liu et al. | |
| 2022/0164483 A1 | 5/2022 | Weiss et al. | |
| 2023/0129202 A1 | 4/2023 | Weiss et al. | |

FOREIGN PATENT DOCUMENTS

| | | |
|---|---|---|
| KR | 101993705 | 6/2019 |
| WO | 2013116256 | 8/2013 |
| WO | 2015157526 | 10/2015 |
| WO | 2017201489 | 11/2017 |
| WO | 2020011447 | 1/2020 |
| WO | 2020048119 | 3/2020 |
| WO | 2021250679 | 12/2021 |

OTHER PUBLICATIONS

Eurpean Supplamental Search Report dated Nov. 25, 2022 for European application 20782042.4 filed Apr. 1, 2020.
International Search Report dated Jul. 29, 2020 for International application PCT/IL2020/050397 filed Apr. 1, 2020.
International Search Report dated Aug. 17, 2023 International application PCT/IL2023/050458 filed May 4, 2023.
European Extended Search Report dated Apr. 11, 2024 for European application 21785725.9 filed Oct. 31, 2022.
International Written Opinion dated Jul. 15, 2021 for International application PCT/IL2021/050409 filed Apr. 8, 2021.
European Extended Search Report dated Jan. 26, 2024 for European application 21821205.8 filed Jan. 13, 2023.
International Search Report dated August Jul. 29, 2020 International application PCT/IL2020/050397 filed Apr. 1, 2020.
Office Action dated Jan. 19, 2024 for U.S. Appl. No. 17/599,603, filed Sep. 29, 2021.
Ning San Chang, SMV—A Computer Vision Program for Loading Surface Mount Components, Proceedings of SPIE, vol. 0557, Dec. 19, 1985 (Dec. 19, 1985), pp. 1-6.
Daniel Singer. This AI Startup Keeps Counterfeit Components Out of Your Gadgets [retrived 1-27 on Nov. 13, 2019]. retrived from <https://www.startuphub.ai/this-ai-startup-keeps-counterfeit-components-out-of-your-gadgets> Daniel Singer, Nov. 19, 2019 (Nov. 13, 2019).
Search Report and Written Opinion dated Jun. 13, 2024 for PCT Application No. PCT/IL24/50206 filed Feb. 22, 2024.
Written Opinion dated Sep. 12, 2024 for PCT Application No. PCT/IL2023/050458 filed May 4, 2023.
Office Action dated Apr. 17, 2025 for U.S. Appl. No. 18/862,538, filed Nov. 3, 2024.
Office Action dated Mar. 26, 2025 for U.S. Appl. No. 17/911,658, filed Sep. 15, 2022.

* cited by examiner

SYSTEM AND METHOD FOR TRACING COMPONENTS OF ELECTRONIC ASSEMBLY

RELATED APPLICATIONS

The present application is a US National Phase of PCT Application No. PCT/IL2021/050708, filed on Jun. 10, 2021, which claims the benefit under 35 U.S.C. 119 (e) of U.S. Provisional Application 63/038,757 filed on Jun. 13, 2020, the disclosures of which are incorporated herein by reference.

FIELD OF THE INVENTION

The present disclosure relates generally to the quality of electronic system resources and, more specifically, to systems and methods for identifying and tracing components of electronic assemblies.

BACKGROUND OF THE INVENTION

A typical electronic assembly may comprise a number of components assembled in a given arrangement. The components may be arranged in a defined configuration and connected by performing soldering operations thereon. An electronic assembly may be deployed in a wide range of industries, for example, automotive, electrical, electronics, pharmaceutical, food, and so forth. In certain cases, any of the components of the electronic assembly may be compromised or defective. In such cases, the traceability of each of the components of the electronic assembly may be crucial to identify the defective or compromised components in all the manufactured systems in order to be able to recall and retrofit only the systems that requires replacement, to ensure overall quality of the electronic assembly.

In recent years, traceability has been increasing in importance and spreading into a wide range of fields. In this regard, gathering of tracing information relating to the components such as manufacturer information, supplier information, are crucial to enable traceability of the components. Such tracing information for the components may be gathered by tracking the components during several processes undergone by the corresponding components, in order to ensure that the history of the components may be reliably traced. Conventionally, tracing information for the components of the electronic assembly may be gathered at a manufacturing site of the electronic assembly. For example, logistical and process information of the components may be collected during material management process and the manufacturing of the electronic assembly. Further, tracing information pertaining to the components are described and labeled on a packaging of the components. Such information may be provided by vendor, such as supplier, distributor, or manufacturer of the components. However, the gathered tracing information that is taken from the packaging of the component is not cross-checked with the components itself. Commonly, the information provided by the vendor on the container is trusted, and further no testing is performed on the components.

Due to such nature of gathering of tracing information, the tracing information is not always accurate. In an example, the tracing information provided by the vendor may be incorrect, and in certain cases, malicious and fraudulent. In another example, the tracing information provided by the vendor may be incomplete thereby providing no trace of, for example, raw materials of the component. As would be understood, tracing information on the packaging of the components still fail to authenticate tracing of the component, based on state of the components, e.g., thereby failing to identify any compromise or defect within the component.

Furthermore, typically, the components and their corresponding tracing information are not authenticated owing to manual and labor-intensive methods of inspection of the components. Conventional, manual methods of inspection of components may substantially increase cost and time of manufacturing of the electronic assembly. Subsequently, the components are arranged to form the electronic assembly without any authentication of the components or the tracing information of the components. Therefore, manufacturing electronic assembly without authentication of components paves way to use of malicious, compromised or defective component(s) within the electronic assembly which may result in huge damage taken in shape of loss of reputation, reworks, lawsuits, failures in operation, loss of functionality or cyber penetration. Arrangement of the components within the electronic assembly, without authentication of tracing information thereof, may cause security and quality breach.

It is an object of the present application to provide an automated and efficient system and method for tracing components and information of components in an electronic assembly, in line with the assembly process, to eliminate security threats associated thereto.

SUMMARY OF THE INVENTION

Some embodiments of the invention allow tracing components of an electronic assembly, and the method may include obtaining an image of a component of the electronic assembly, generating identification information of the component based on visual features of the component, authenticating the component based on the identification information, generating correlating information by associating the component to an electronic assembly and classifying the component to a group based on the visual features of the component.

Some embodiments of the invention may include comparing the identification information and the correlating information with set-up information pertaining to the component.

According to some embodiments of the invention, classifying the component to the group is performed by a machine learning algorithm.

Some embodiments of the invention may include alerting if the set-up information is different from one of the identification information and the correlating information.

Some embodiments of the invention may include tracing a component based on the correlating information.

According to some embodiments of the invention, upon a detection of an electronic assembly comprising a deficient component assigned to the group, tracing all components assigned to the group may be performed.

Some embodiments of the invention may include identifying one or more electronic assemblies comprising components from the group based on the correlating information.

According to some embodiments of the invention, identifying one or more electronic assemblies is to reduce an extent of a recall of electronic assemblies.

According to some embodiments of the invention, the visual features of the component may be one or more features from a group consisting of: discoloration, edge shapes, roughness, marking, tags or text of the component.

According to some embodiments of the invention, the set-up information pertaining to the component is provided by one or more of a group consisting of: a vendor of the component, an inventory related to the component, a manufacturing execution system of the component, a manufacturer of the component.

Some embodiments of the invention may include a system for tracing components of an electronic assembly, the system may include a memory, an imaging device and a processor configured to: obtain an image of a component of the electronic assembly from the imaging device, generate identification information of the component based on visual features of the component, authenticate the component based on the identification information, generate correlating information by associating the component to an electronic assembly, and classify the component to a group based on the visual features of the component.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
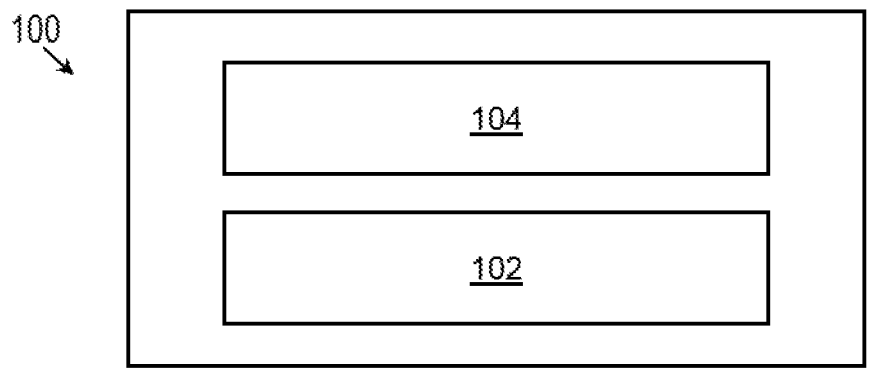
FIG. 1 is a schematic illustration of a system for tracing electronic components of an electronic assembly in accordance with some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

The term "component" may be used herein to refer to any electronic component or device that may be a part of electronic circuitry, or the electronic circuitry itself. For example, the component may be an electronic component affixed on another electronic component to implement the electronic circuitry. Examples of the component may include, but are not limited to, a resistor, a capacitor, an inductor, a transistor, an integrated Circuit (IC), a microcontroller, a diode, a Light Emitting Diode (LED), an electronic socket, a circuit board and printed circuit board (PCB). The components referred herein may be any element that may be arranged in a certain manner to form the electronic assembly. A component or an electronic component may perform certain operations independently or with other components to implement the electronic assembly. A plurality of electronic components may be assembled to form a hardware resource. For example, the electronic assembly may be a hardware resource (such as computing device, laptop computer, desktop computer, mobile phone, and the like), or a device (such as camera, speaker, headsets, light, electro-mechanical device, and the like), or any electronic device. As would be understood that the electronic assembly may include a number of constituent elements, wherein such constituent elements may be implemented using components arranged in a defined manner.

According to embodiments of the invention, a hardware resource or an electronic assembly may include a multitude of components. For example, the components may be arranged in a defined configuration, also known as electronic circuitry, owing to soldering operations performed thereon, to implement the hardware resource. An electronic circuitry makes use of a variety of components. Typically, one or more devices may be affixed on a board, for example, Circuit Board (CB) and Printed Circuit Board (PCB) to form the electronic circuitry. One or more devices may be affixed on the board by employing techniques, for example, soldering. Each component, such as a passive electronic component or an active electronic component may be provided with connecting leads or balls, or any other method to allow connecting to the CB or PCB. Soldering operations are performed on the connecting leads for affixing the component. A PCB may also include a plurality of contact pads which are used for soldering operations.

Some embodiments of the invention may provide a system and a method for tracing components of an electronic assembly by inspecting the electronic components, or parts of the components, and electronic assembly to derive true information pertaining to the components and further enabling authentic traceability of the components that may be independent of information supplied by vendors. Some embodiments of the invention may provide a process for reliable traceability of components of the electronic assembly. For example, the traceability may enable tracking of source of the components of the electronic assembly and further tracking of the components during assembly thereof to form the electronic assembly. In an example, the traceability of components may provide information pertaining to procuring or raw materials, i.e., components, admitting the components into storage, dispensing the components for kitting, setting-up the components to form the electronic assembly, and accepting the assembled electronic assembly for reflow, and all other stages in its life cycle.

In some embodiments of the invention, the components included within the electronic assembly may be listed in a Bill of Material (BOM). Moreover, for every component in the BOM, there may be one or more manufacturer associated with the component that may be listed in the BOM. Additionally, the BOM may further include one or more purchasing source, for example, supplier, vendor, distributor, and the like, corresponding to the one or more manufacturer. Optionally, a manufacturer of the electronic assembly may describe preference and requirements for procuring the components. Further, a procurement process of the components may be initiated that balances availability and price of the components with the risk of inadvertently purchasing a counterfeit component. For example, on procurement of the components, information pertaining to, for example, manufacturer, purchasing source, and so forth may be included within the BOM for the electronic assembly.

According to some embodiments of the invention, the procured components for manufacturing the electronic assembly are accepted into storage. For example, logistical information corresponding to the components may be received and added to an inventory. Such logistical information may be received from a vendor of the corresponding components. Moreover, a verification may be performed at the storage, such as to verify that a packaging of a component contains inscribed component. For example, such verification may be done manually, based on freight documentation, logistical information, and tracking tools. Moreover, the packaging of the components may be in form of, for example, reels, rod, tray or bulk packaging. Upon verification of packaging, each package may be fitted with a local identification and the local identification allows factory material management system to track the components within factory, wherein the components may be assembled for manufacturing of the electronic assembly. This local identification may be used to track the components' packaging through assembly and production process. Moreover, a local identification of a component may relate to, for example, logistical information, freight documentation, and/or tracking information of the component that may be stored within the inventory.

In some embodiments of the invention, a kit of all the components in the BOM, that are required for planned electronic assembly manufacturing job, may be prepared. In this regard, the required components for the planned electronic assembly manufacturing job may be collected from storage. For example, a work order may be issued for the storage, wherein the work order may include a list of the components and local identification corresponding to the components. Subsequently, the components may be collected and moved to a setup ground, wherein the components may be assembled at the setup ground to form the electronic assembly. Further, the components may be loaded onto, for example, feeder, magazine, or pallet. An entire load of machines may be prepared on feeder carts to initiate a setup process for manufacturing the electronic assembly. For an example, a setup order may be passed, wherein the setup order includes a list of all the components, local identification corresponding to the components and designated slot or location of the corresponding component in the electronic assembly. For example, matching between the local identification of a component and the designated slot or location of the component is performed either manually or with the assistance of a code reader. Subsequently mounting machines, for example, SMT pick and place system, may pick components from the feeder and place them onto, for example, designated slot or location on a circuit board to form the electronic assembly.

Conventionally, no physical inspection of the components within packaging is performed in the storage. For example, the storage assumes that the logistical information supplied by the vendor is correct and trustworthy. Further, during assembly of the components for manufacturing the electronic assembly, local identifications of the components are read to verify use of correct components at corresponding designated slot or location. Current traceability of the components may be achieved based on the logistical information from the vendors and may process information in the manufacturing process within factory based on local identifications. Further, interfacing the storage inventory with assembly process information (which may be based on local identification) may allow a user to trace the components used in the manufacturing of the electronic assembly. Such information for traceability is solely dependent on information input by the vendors and thus may be unreliable or compromised in certain cases.

Some embodiments of the present disclosure may enable automated authentication of traceability of components of an electronic assembly. For example, the system and method described herein may be employed to authenticate information for tracing of the components provided by, for example, vendors. According to some embodiments of the invention, information pertaining to the components that may be provided by vendors of the components may be obtained and authenticated based on true state of the components. The true state of the component may be deduced, concluded and generated based on a representation, e.g., an image of the component. Information provided by the vendors, also referred to herein as "set-up information", may be cross-referenced with true state relating to the components based on one or more images of the components also referred to herein as "placement information" to authenticate traceability of the components. Such cross-referencing is performed in an automated manner and in real-time.

According to some embodiments of the invention, label information may be generated for each component of the components in the electronic assembly. The label information may be generated based on cross-reference, correlation or comparison of the set-up and placement information associated with the corresponding components. The label information may include all information pertaining to each of the components in the electronic assembly. The label information for each component may include the corresponding set-up information provided by the vendor and the placement information generated based on the image, e.g., the true state or condition of the component based on one or more features extracted from the representation or image of the component. For example, the placement information may be based on features, attributes, characteristics, or qualities which are extracted from an image of the component, e.g., visual features, physical attributes, marks, tags, text written on components, or any other feature related to the component.

According to some embodiments of the invention, authentication of traceability may prevent assembly of any compromised or defective component(s) within the electronic assembly. For example, authentication of the traceability pertaining to the components may prevent use of counterfeit components within the electronic assembly. Based on the cross-referencing and authentication of the traceability, a report, such as an as-made report, may thus be generated. Further, the as-made report includes true logistical information for each of the components that enables reliable tracking of, for example, source, manufacturer, supplier, distributor, and the like of the corresponding components. Beneficially, the system authenticates the traceability pertaining to the components in time, cost, and labor effective manner. The system described in some embodiments of the invention may prevent use of any compromised component in the electronic assembly due to fallacious traceability information for such components, thus eliminating security and quality risks in environments where the electronic assembly may be implemented. Moreover, tracing information of components in an electronic assembly may allow the ability to reduce the extent of a recall of large number of electronic assemblies by slicing the population of a group of electronic components into subgroups based on the type of fault in the components, as described in some embodiments of the invention.

According to some embodiments of the invention, an image of a component is further processed, evaluated and examined by, for example, a machine learning (ML) algorithm and/or a classification network a such that each of the components may be classified into one or more groups based on visual features of the component. The method may include training a machine learning (ML) algorithm and/or a classification network to classify electronic components based on one or more features, attributes or characteristics related to an image of the component. Some embodiments of the invention may include receiving or obtaining images of a plurality of electronic components and grouping, dividing or classifying the plurality of components to one or more groups based on one or more common features. Upon detection of a deficient electronic component, some embodiments of the invention may allow to trace other components associated with a specific group to which the deficient electronic component is classified to. For example, once an electronic component classified into a first group is determined as a deficient electronic component, other electronic components which are classified into the first group may be traced to allow identification of other electronic assemblies which include components from the first group. Tracing components assigned to the same group to which a deficient component is assigned may allow reduction of the extent of a recall by slicing the population of a large unit, e.g., a production lot, into subgroups based on the type of fault in the components.

For example, when a fault is found in a product, it is assumed that a fault may be found in a particular production unit, e.g., an entire production lot. However, if the source of the fault is that a specific package, e.g., a reel, a tray or any subunit of the entire lot may be counterfeit or defected, then there is no need to recall all boards or assemblies associated by this lot. Tracing the boards or assemblies associated with the specific package, reel or tray may be sufficient. For example, if a specific package of components was handled or packaged in a way that caused degradation of that specific package, only the components from that specific package should be recalled, and there is no reason to recall all the components of the entire lot, in order to save costs, e.g., to the manufacturer.

According to some embodiments, in some cases, the faults in the component may be traced to a particular defect in the components. For example, peeling of the leads, cracks, corrosion, soldering leads or balls with poor solderability, etc. In some examples, the source of fault may include a visual and/or physical evidence on the component. Other examples may include any other visual distinctive property of the faulty component that may be used to single out components from within a group, a batch or a lot which may be used to avoid returning of the entire batch or lot. The visual distinctive properties or visual features may include, but are not limited to, discoloration, edge shapes, roughness, or any other visual property of the component.

In some embodiments, information from the production process is also collected for analysis, like: SMT machine operating parameters that may affect the quality of the product. For example, placement accuracy, lighting parameters, focus parameters, placement force, source track in the machine, etc. This way, upon failure in the field, the common denominator can be found based on all the production features used. For example, if a component failed in the field because the production slot in one machine was set wrongly or had a malfunction, this may be used to detect the source cause for the failure, rather than returning the entire production lot.

According to some embodiments of the invention, traceability of a device may be defined based on traceability of its constituent elements. Pursuant to the present subject matter, the traceability of the electronic assembly is the ability to trace the components within the electronic assembly. For example, the traceability of the components is defined based on source of the components, e.g., when and where the components are produced or manufactured and by whom. Further, based on true physical state of components, corresponding manufacturing information for to the components may be traced to origin thereof.

FIG. 1 is a schematic illustration of a system for tracing electronic components of an electronic assembly in accordance with some embodiments of the invention. System 100 may include an imaging system 102 and a processor 104. Imaging system 102 may be used for capturing, detecting, inspecting, probing, testing and/or sensing an electronic component. In some embodiments of the invention, imaging system 102 may be used for capturing a representation of an electronic component either from the top and/or from the bottom or from any other direction. A representation of the electronic component may be a pictorial depiction of the component, e.g., an image, a photograph, a three-dimensional image or any other pictorial representation of the component. In some embodiments of the invention, imaging system 102 may be connected, linked, attached, related to and/or include one or more measurement probes which may be positioned above or below a detected electronic component.

Processor 104 may be an assembly of one or more computational elements arranged in a serial or parallel configuration to perform operations associated with the system 100. Processor 104 may be connected to or coupled to imaging system 102. For example, processor 104 may be communicatively coupled with the imaging device 102, via a data communication network. Such a data communication network may be implemented by way of wired communication means, wireless communication means, or a combination thereof.

In some embodiments of the invention, processor 104 may include, or may be coupled to, other computational entities, for example, a memory, a network interface, a database, a server and the like. In some embodiments of the invention, processor 104 may be implemented internally in system 100, while in other embodiments, processor 104 may be implemented externally, e.g., on a cloud or in a remote facility or server. It is to be noted that, in certain implementations, processor 104 may be coupled to a plurality of imaging systems 102 at a given time. Processor 104 may be used for detecting, classifying and tracing of a plurality of components, simultaneously. However, for the sake of brevity, the present subject matter is explained in conjunction with a single component and a single imaging system. Any of the components included in system 100 may be the example computer system shown in FIG. 7, and any of the operations described with relation to system 100 may be performed, for example, by the example computer system shown in FIG. 7.

Processor 104 may obtain a set-up information pertaining to the components within the electronic assembly. For example, the set-up information may correspond to information provided by, for example, corresponding vendors of the components. Moreover, the set-up information may be provided by one of: an inventory, a manufacturing execution system or original manufacturer or vendor relating to the components. For example, set-up information may be obtained by reading corresponding packaging of the components. In another example, the user of the system may compile such set-up information pertaining to the components, based on planned electronic assembly manufacturing job, for example the setup recipe. For example, the set-up information may be gathered from the inventory based on BOM, work order, logistical information provided by vendors, freight documentation, tracking of components, and/or set-up order for the electronic assembly.

According to some embodiments of the invention, processor 104 may obtain a representation of each of the components of the electronic assembly from imaging device 102. For example, the representation may be a pictorial representation, such as an image. Processor 104 may process the representation of the electronic assembly and/or the representation of the one or more electronic components of the electronic assembly to derive placement information pertaining to the components, e.g., each of the components of the electronic assembly. The representation of the electronic assembly may be inspected to identify the components and feeder associated with each of the components. For example, the processor 104 may process the representation of the electronic assembly to identify location of the components in the electronic assembly, true manufacturing information relating to the components and further state of the components.

Processor 104 may obtain an image of each of the components of the electronic assembly and may derive the true, real, authentic, reliable information from the image of the component. For example, manufacturing information such as manufacturer name, manufacturing location, manufacturing time, and the like, state or condition of the component, and true location or position of the component in the electronic assembly. Such information for each of the components of the electronic assembly, derived by the processor from the representation, constitute the placement information. Placement information is derived, concluded or determined based on true state of the components, true mounting location of the components in the electronic assembly and true manufacturing information of the components.

Processor 104 may generate label information for the components in the electronic assembly based on the set-up information and the image of the component. The label information may be generated based on cross-referencing or comparison of the set-up and placement information associated with the corresponding components. For example, processor 104 may compare set-up information of a component, that may be provided by inventory, with the placement information that may be extracted or concluded from the image of the component. For example, the processor may identify information within the set-up information, for a component, based on a local identification associated with the component. The local identification for the component may be indicated within the representation of the electronic assembly, for example, by way of feeder associated with the component. Subsequently, processor 104 may identify any irregularity between the set-up and the placement information. Processor 104 may generate label information based on the comparisons and local identification corresponding to the components. Label information for the component may include correlation between the set-up information pertaining to the component and information generated based on the image of the component. Label information may further include set-up information of the component, placement information associated with the component and any irregularity identified by the processor 104 based on the correlation or comparison of the set-up information and the placement information.

Processor 104 may authenticate the components, based on the label information, if no irregularity is found in the label information. In an example, the processor 104 may compare, for example, true manufacturing information of the components with the manufacturing information provided by the inventory; true mounting location of the components in the electronic assembly with setup order within the set-up information; and true state of the components with authentication library information. The authentication library information corresponding to the components may be provided to the processor 104, wherein the authentication library information specifies ideal state for the components.

The processor may further generate an as-made report for the electronic assembly. The as-made report may include the generated label information and may provide true traceability for the components. For example, the processor 104 may employ an artificial intelligence (AI) module which may implement, use or apply one or more machine learning algorithms and/or one or more classification networks for performing operations required for tracing components. The present example and other examples, for implementation of the present subject matter, are explained in detail in conjunction with FIG. 2.

Figure 2:
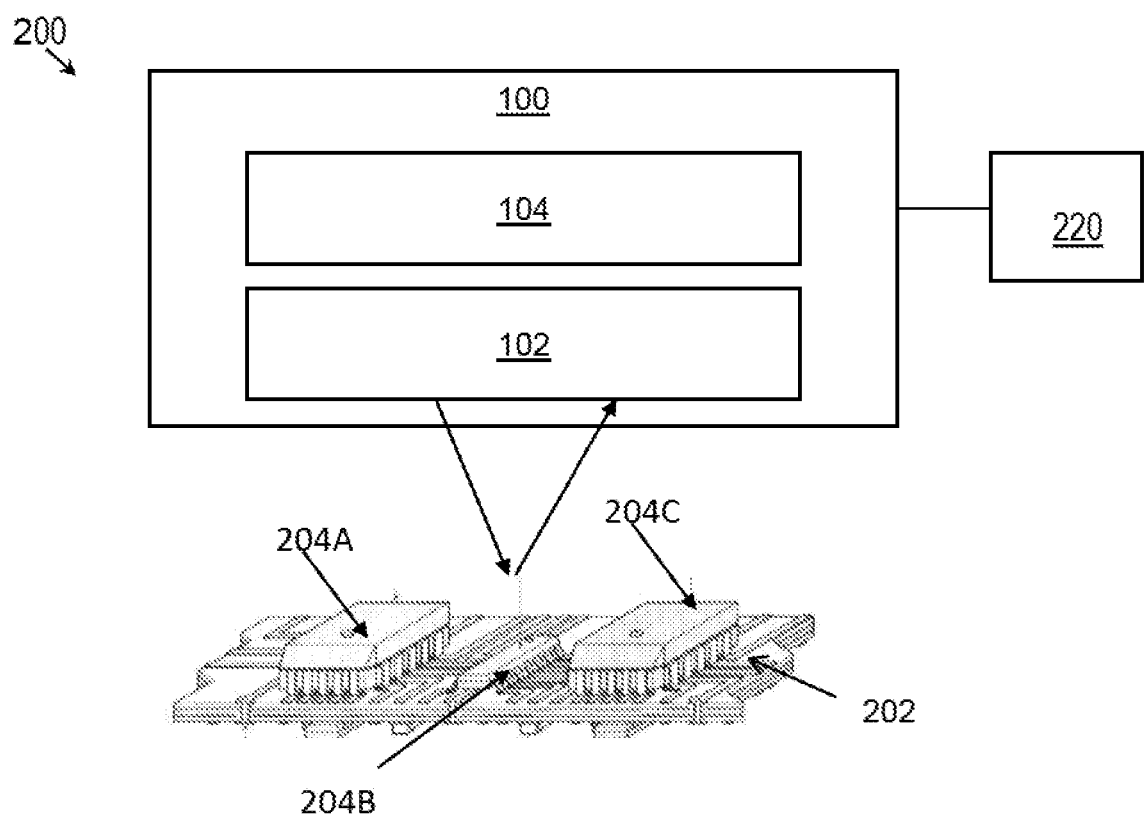
FIG. 2 is schematic illustration of an environment where a system for tracing components of an electronic assembly is implemented in accordance with some embodiments of the invention.

FIG. 2 is a schematic illustration of an environment where a system for tracing components of an electronic assembly is implemented in accordance with some embodiments of the invention. Environment 200 may include system 100 of FIG. 1 for tracing components 204A, 204B and 204C (collectively referred to as, components 204) of an electronic assembly 202. System 100 may include an imaging device 102 for capturing a representation of electronic assembly 202 from a top, a bottom, or a side, or all positions. Further, system 100 may include a processor 104 for authenticating traceability of components 204 of the electronic assembly 202. Electronic assembly 202 may be, for example, a surface mounted electronic assembly comprising a plurality of Integrated Circuits (IC). However, the depiction of electronic assembly 202 as the surface mounted electronic assembly is only illustrative and should not be construed as limiting in any way. It is to be noted that, in other implementations of the present subject matter, the components 204 may be traced separately, prior to assembly thereof to form the electronic assembly. Each of components 204A, 204B and 204C, also referred to herein as components 204, may be any electronic component, for example, a resistor, a capacitor, a transistor, an Integrated Circuit (IC), an inductor, an electronic chip, PCB, or any other electronic component or electronic circuitry.

System 100 may further include or may be coupled to a computing platform 220. Computing platform 220 may include one or more services coupled to system 100 and/or processor 104 by one or more communication network. Such a communication network may be implemented by way of wired communication means, wireless communication means, or a combination thereof. Computing platform 220 may include, for example, a remote processor and/or, graphics processing unit (GPU) and/or, a gateway server and/or a database. Any other device, service or platform may be included in computing platform 220. Any of the components included computing platform 220 and system 100 may be the example computer system shown in FIG. 7, and any of the operations described with relation to computing platform 220 and system 100 may be performed, for example, by the example computer system shown in FIG. 7.

According to some embodiments of the invention, imaging device 102 may capture representation of electronic assembly 202. For example, the imaging device 102 may be a digital still camera, a camcorder, a video camera, industrial camera, pick-and-place camera, a profiling camera and the like. A captured representation of component 202 may be a three-dimensional or a two-dimensional image, drawing, projection, and the like. In some embodiments of the invention, imaging device 102 may be an on-premises camera that is already a part of an SMT pick and place system. Further, imaging device 102 may provide the representation of the component to processor 104 for processing. The representation of the electronic assembly 202 may include representation of the components 204 and a feeder associated with each of the components 204.

According to some embodiments of the invention, processor 104 may employ an AI module. The AI module of processor 104 may be an electronic circuitry, a software-implemented program, or a combination thereof. The AI module may implement, use or apply one or more machine learning algorithms and/or one or more classification networks to assess attributes, features and/or characteristics of a components in order to classify the components into groups or clusters of components based on similar, identical, equal or substantially equal features. It should be understood that a component may be classified to more than one group and that a group is determined by the classification network based on analysis of images of components. The AI module may be implemented using machine learning algorithms for such operations. The machine learning algorithm or engine may be trained using a plurality of images associated with electrical components.

The AI engine included in processor 104 may employ one or more machine learning algorithms that may use training dataset to acquire knowledge and further apply the acquired knowledge for new environments, or components, also referred to herein as "test components". In case of no historical data or training set regarding a component to be assessed, the AI engine may devise a new algorithm for assessing or evaluating images of a component. The machine learning engine or algorithm may employ deep learning algorithms for performing operations based on patterns from past data without being explicitly performed. Thus, machine learning algorithms employed by processor 104 may enable assessment of images of components in an automated manner without human involvement. The processor or the machine learning algorithm of the processor may be an electronic circuitry or a software-implemented program. The machine algorithm may be trained to classify electronic components based on one or more features related to the visuality of the electronic components.

According to some embodiments of the invention, the AI module of processor 104 may obtain set-up information, e.g., from an inventory and may further obtain or receive from imaging device 102 the representation or image of one or more components of the electronic assembly 202. The AI module may process the representation of the electronic assembly 202 to determine placement information for the components 204 of the electronic assembly 202. The placement information may prescribe true state of the components 204, true mounting location of the components 204 in the electronic assembly 202, and true manufacturing information of the components 204. The AI module may further generate label information for the components 204 based on, for example, comparison of the set-up and placement information. Generating label information for a component may include identifying irregularity based on a comparison of the set-up information and the information generated based on the image of the component. As would be understood, the set-up information specifies information pertaining to the components available at the inventory, that may include, logistical information provided by vendors, freeing documentation, BOM, and the like. Further, the label information may be generated based on assessment with respect to comparison between the set-up information and the placement information. The label information may include, for example, any irregularity or assessment of authentication of the components 204.

In some embodiments of the invention, the AI module may authenticate components 204 based on the label information pertaining to the components. For example, the AI module may identify any deviation or irregularity between the set-up and placement information, as defined within the label information. The placement information, prescribing the true state of the components, and the set-up information, prescribing information obtained from the inventory, may further be compared with authentication library information that stores ideal true state for the components. The authentication library information may be defined by way of a big data library. Moreover, the AI module may be trained using a plurality of images associated with components 204.

According to some embodiments of the invention, having a visual image of components and the ability to detect features, attributes, marks, characteristics or features may allow classifying each component to one or more groups based on visual features of the component. This may allow singling out individual components or groups of components upon a detection of an electronic assembly having a deficient component. When a deficient component is detected, it is determined to which group it is classified, and other components assigned to the same group may be traced in order to reduce the volume of a recall, e.g., from a complete lot to few single boards or components. Some embodiments of the invention may classify the components based on attributes or characteristics obtained from their images into one or more groups. For example, the components may be separated into groups based on their visual images using machine learning classification methods employed by the AI module of processor 104. Exemplary groups may be based according to defect types of components, physical features of components, solderability condition of components, dimensions of components, discoloration of components, scratches, marks and/or cracks on components or any other feature. The classification information may be later used to reduce the common dominator of a faulty group and thus, for example, reduce the extent of a recall.

In some embodiments, the AI module, on processing the representation of the electronic assembly 202, may identify the electronic assembly 202 based on, for example, unique marking, size, engraving, indentations, etc. Thereafter, the AI module may determine a processing algorithm for each of the components 204, for determining placement information of the components 204 and also assessing tampering in the components 204. Optionally, authentication library information for the components 204 may be constituted within the processing algorithm. In some embodiments of the invention, the processing algorithm may be based on at least one of machine learning or big data. For example, the processing algorithm may employ deep learning algorithms (for example, neural networks). For example, the processing algorithm determines the placement information, generates the label information and assesses tampering in the components 204, without being explicitly performed for the same. For example, the processing algorithm may be previously trained using training datasets, wherein the training datasets may be labeled, unlabeled or a combination thereof. Subsequently, the processing algorithm may be trained using the training datasets in a supervised, unsupervised, or reinforced manner. Moreover, in some cases, the AI module may generate the processing algorithm for each of the components 204 based on the representation of the components 204 and training datasets.

According to some embodiments of the invention, the AI module (or the processing algorithm or the machine learning algorithm) may be trained using a plurality of images of components 204, wherein the plurality of images indicate at least one of manufacturing information associated with components 204, ideal true state associated with components 204, tampered condition and non-tampered condition for components 204, solder-leads or balls conditions for components 204 or any other physical and/or visual attribute of component 204. For example, each of the plurality of images of components 204 may be labeled based on the manufacturing information, such as manufacturer, component package type, model, connecting leads or balls, manufacturing date, manufacturing place, type, manufacturing process, manufacturing equipment or machinery, and the like. Moreover, the AI module may employ the plurality of images of a component from the dataset to derive true manufacturing information of the component, based on true state of the component. For example, the training dataset may also include plurality of images of the components 204 that may be labeled based on tampered and non-tampered condition and/or solder-leads or balls condition. Such labeling of the plurality of images may be used for the assessment of tampering in the components 204.

According to some embodiments of the invention, the AI module in the processor 104 may cross-reference the placement information and the set-up information to generate the label information of each of the components 204. Furthermore, based on the label information of components 204, the AI module may operate to authenticate the traceability of components 204. In certain cases, the authentication of traceability of components 204 may be performed prior to assembly thereof. Alternatively, the authentication of traceability of components 204 may be performed after the assembly. System 100, upon identifying fraudulent component(s) (whose traceability may not be authenticated), may raise an alert signal for the corresponding fraudulent component(s). For example, system 100 may authenticate the traceability of components 204 and may assess events of tampering in the components during a time period between a pick time and a place time in an SMT pick and place system.

It is to be noted that the assessment of tampering enables identification of authenticity of the components, even if corresponding manufacturing of the components may be authentic. For example, such assessment of tampering identifies a fraudulent component that may be manipulated by re-programming thereof. Such re-programming may be performed on an authentic component, wherein the re-programming may introduce malicious cyber firmware into the component and further cause the re-programmed fraudulent component to pose as an innocent or authentic component.

According to some embodiments of the invention, processor 104, e.g., AI module of processor 104 may generate an as-made report corresponding to components 204 of electronic assembly 202. Specifically, the as-made report may include true logistical information pertaining to each of components 204 assembled within the electronic assembly 202. Hence, the as-made report may not include any fallacious information that may be provided by, for example, vendors of the components. For example, the as-made report may include at least one of: the representation of the electronic assembly, representation of the components, the set-up information, the placement information, authentication library information, (that specifies ideal true state of the components 204), the label information (that indicates assessment of authentication of the components 204). In certain cases, the as-made information may also include assessment of tampering of each of the components 204 and a representation of authentic component corresponding to an identified compromised or fraudulent component.

For example, the identification of the components in the electronic assembly may be performed without prior information. Optionally, identification of components 204 may be performed based on the set-up order and work order previously generated by a user of system 100, such as manufacturer of electronic assembly 202. Further, the obtained set-up information, placement information from the representation and the generated label information are used to authenticate components 204 of electronic assembly 202. In this regard, system 100 may not require the set-up information, placement information or label information in order to make the identification of components 204. Further, the authentication of components 204 may be performed by identification of components 204 and cross-checking the information on how each of components 204 are supposed to be placed on the board. In some embodiments of the invention, processor 104 or the AI module of the processor 104 may further generate the alert signal on failed authentication of any of the components 204. In this regard, the failed authentication may be due to mismatch between tracing information obtained from inventory and true information, set-up order and true mounting location of the components 204, or tampering in components 204.

Figure 3:
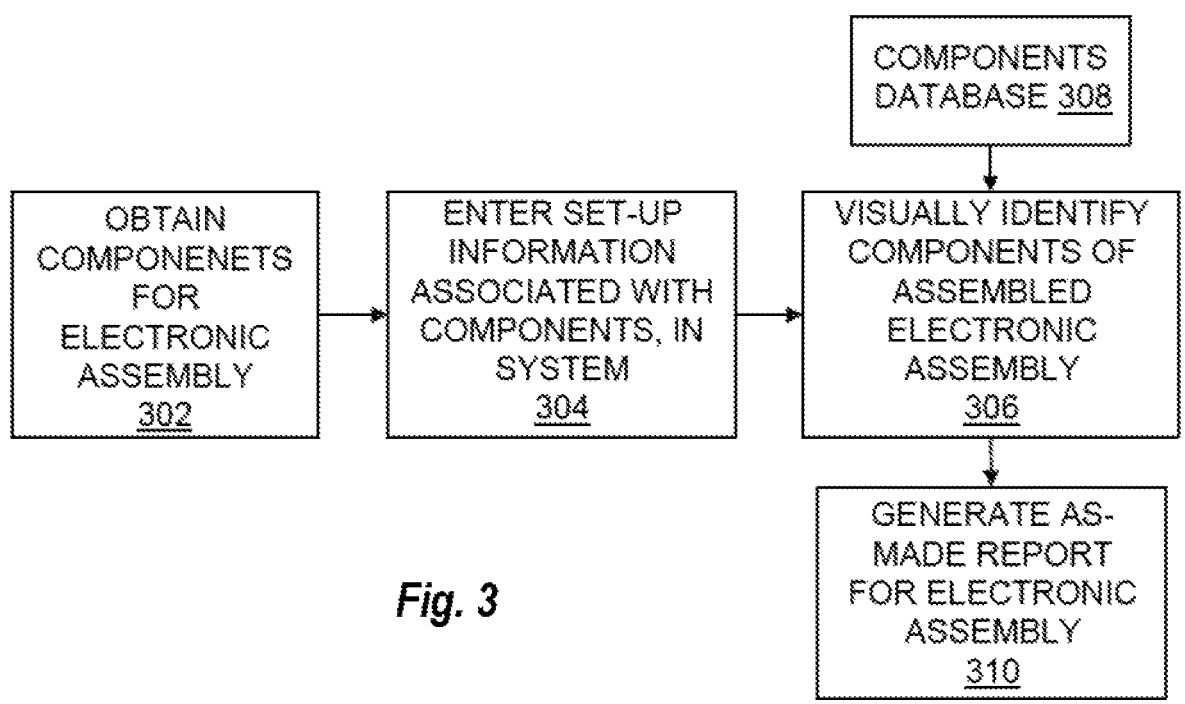
FIG. 3 is a flowchart of a method for generating an as-made report for an electronic assembly, according to some embodiments of the invention.

FIG. 3 is a flowchart of a method for generating an as-made report for an electronic assembly, according to some embodiments of the invention. As shown at block 302, components for the electronic assembly may be obtained, for example for components 204 for the electronic assembly 202 of FIG. 2. The components may be obtained from, for example, respective vendors of the components. At block 304, set-up information may be entered within the system, e.g., system 100 of FIG. 2. The setup information may include information provided by the vendor, information provided at respective containers of the components, Bill of Materials, work order, setup order, and the like. At block 306, the electronic assembly may be visually inspected to identify the components. Placement information for the components may be determined based on visual inspection of the electronic assembly, via a representation, such as an image thereof. Moreover, the electronic assembly may be visually inspected using components database 308, wherein the component database may include a plurality of images to the components for identification and authentication thereof. At block 310, an as-made report for the electronic assembly may be generated. The as-made report may include at least one of: the representation of electronic assembly, representation of the components, a Bill of Material (BOM), the set-up information, the placement information, authentication library information, components database 308 information, the label information. For example, embodiments of the invention may be implemented in conjunction with the assembly process of, for example, a SMT pick and place system. Such an example is explained in detail, with reference to FIG. 4.

Figure 4:
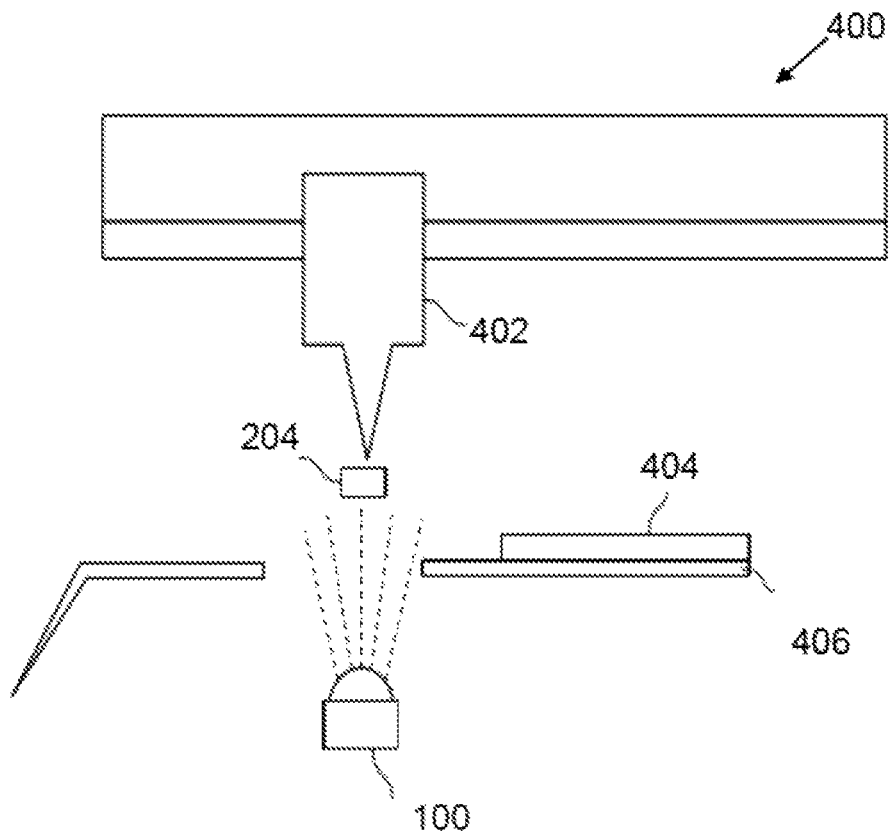
FIG. 4 is a schematic illustration of an exemplary system for tracing electronic components of an electronic assembly within a pick-and-place system, according to some embodiments of the invention.

FIG. 4 is a schematic illustration of an exemplary system for tracing electronic components of an electronic assembly within a pick-and-place system, according to some embodiments of the invention. The methods and the systems for assessing reliability of electronic components which are presented in accordance with some embodiments of the invention, e.g., system 100 of FIG. 1 and or system 200 of FIG. 2 may be used or utilized by, embedded in and/or operated by any other system or machine, for example, reel-to-reel inspection machine, a SMT pick-and-place machine, an X-ray inspection machine or any other system or method that allows high throughput while tracking every individual component features. System 400 may be for example, a SMT pick-and-place machine where a system 100 for automated tracing of components 204 may be implemented. A processor included in or coupled to system 400, for example, embedded system 100, in a reel-to-reel inspection machine or in any other system that may capture images of electronic component, may trace components during inline assembly process of components 204 in, for example, a Surface-Mount Technology (SMT) pick and place system 400.

System 100 includes an imaging device and a processor for operation thereof. In operation, the processor may trace one or more components 204 of the electronic assembly based on corresponding representation and set-up and placement information. According to some embodiments of the invention, system 100 may facilitate the tracing of component 204 during inline assembly process of the electronic assembly in, for example, a Surface-Mount Technology (SMT) pick and place system 400. For example, the imaging device of system 100 may provide the representation of the component 204 to the processor of the system 100 for processing, prior to assembly thereof to form the electronic assembly. It is to be noted that implementation of the system 100 in conjunction with SMT pick and place system 400 should not be construed as limiting in any way.

In some embodiments of the invention, SMT pick and place system 400 may include a head element 402 to place the component 204 on a printed circuit board (PCB) 404 located on a place station 406. The authentication of traceability of the component 204 and assessment of tampering of the component 204 may be performed by the processor in the system 100 by processing representation of the component 204. Component 204 may be probed while automatically being conveyed and used by the SMT pick and place system 400. Component 204 may be assessed, according to some embodiments of the invention, based on set-up and placement information and generated label information associated with the component 204. In some embodiments, processor of system 100 may include an artificial intelligence module for operation thereof. The artificial intelligence module may determine a processing algorithm for authenticating traceability and assessing tampering of component 204. The processing algorithm may be based on machine learning, big data, or a combination thereof.

For example, system 100 authenticates traceability and assesses tampering in component 204 during a time period between picking and placing the component 204. System 100 may move in association with the head component 402. Moreover, the head component 402 may pick the component 204 from a location 'A' and may place the component 204 at a location 'B', wherein the locations 'A' and 'B' are apart from each other. In an example, the location 'A' may be a feeder of component 204 and location 'B' may be the PCB 404. Further, the processor may also generate an as-made report for the electronic assembly. The as-made report may include true logistical information pertaining to component 204 along with other components in the electronic assembly. The true logistical information in the as-made report may be based on, for example, the representation, representation of the components, a Bill of Material (BOM), the set-up information, the placement information, authentication library information, the label information and assessment of tampering in component 204. In some embodiments of the invention, on failure in authentication of traceability or assessment of tampering for the component 204, the processor may generate an alert signal regarding component 204, for inspection. In this regard, component 204 may be moved to a location 'C', wherein the location 'C' may be different from location 'A' and 'B'.

Figure 5:
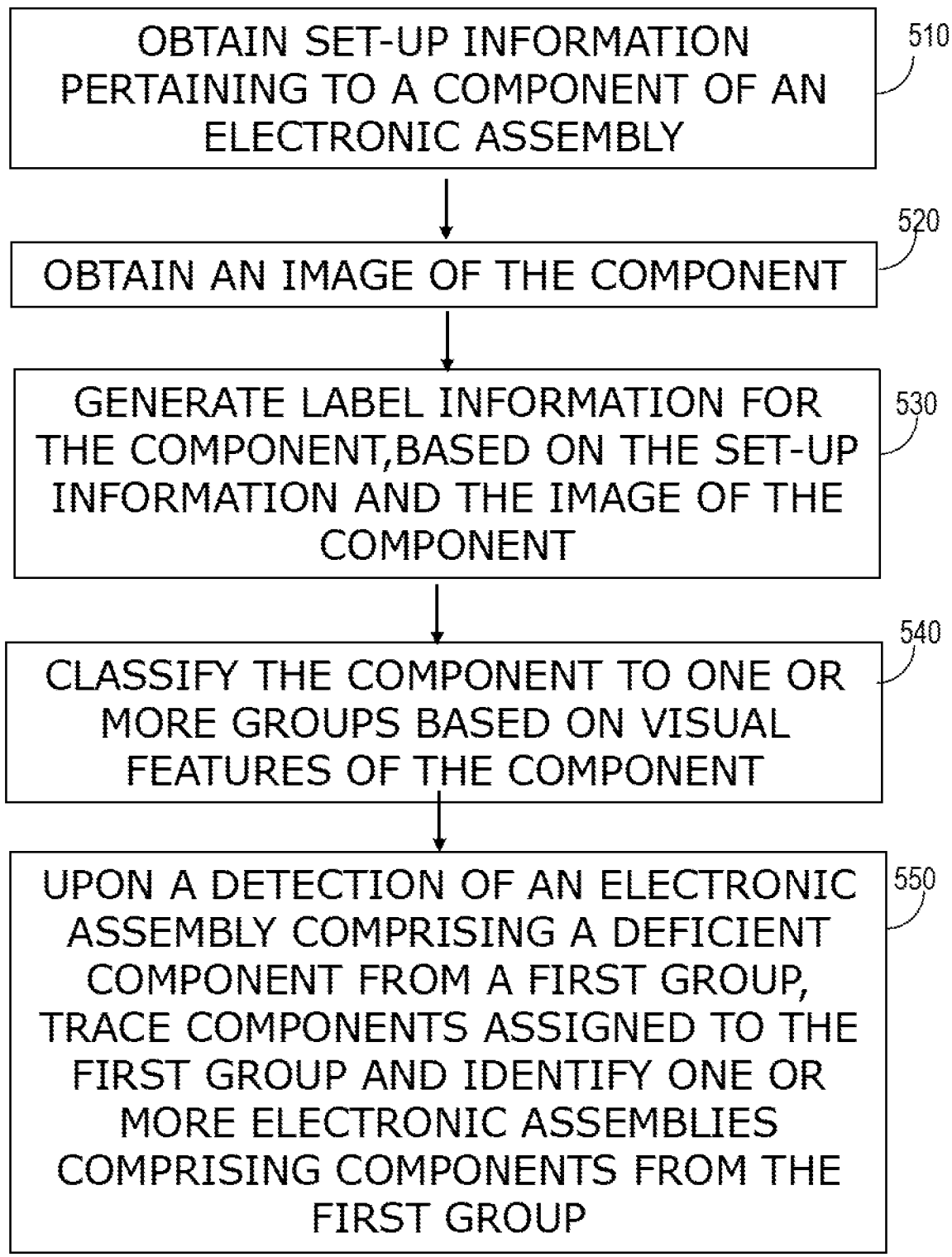
FIG. 5 is a flowchart of a method for automated tracing electronic components of an electronic assembly, according to some embodiments of the invention.

FIG. 5 is a flowchart of a method for automated tracing electronic components of an electronic assembly, according to some embodiments of the invention. Some of the operations of FIG. 5 may be related or may be similar, analogues and/or may match operations performed, for example, by the system shown in FIG. 1 and FIG. 2. As with other method flowcharts, operations of FIG. 5 may be used with operations in other flowcharts shown herein in some embodiments of the invention.

In operation 510, a set-up information pertaining to a component of the electronic assembly may be obtained, e.g., by a processor. The processor may be for example, processor 104 of FIG. 1. For example, a non-transitory computer-readable medium may include instructions executable by a processing resource to trace components of an electronic assembly. The set-up information pertaining to a component may correspond to information provided with relation to the component by a corresponding vendor or provider of the components. For example, the set-up information may be information provided by one or more of a group consisting of: a vendor of the component, an inventory related to the component, a manufacturing execution system of the component, a manufacturer of the component. For example, set-up information may be obtained by reading corresponding packaging of the components or by receiving the information as an input to processor.

In operation 520, an image of the component of the electronic assembly may be obtained or received from an imaging system, or an imaging device, e.g., from imaging system 102 of FIG. 1. The image of the electronic may be taken from a single direction and/or multiple directions. The image may show any direction, side, angel, or point of view with relation to the component, e.g., from top or bottom of the component.

In operation 530, label information may be generated for the component, based on the set-up information and the image of the component. The label information may be generated based on cross-reference, correlation or comparison of the set-up information pertaining to the component and information generated based on the image of the component. The label information for each component may include the corresponding set-up information provided by a vendor of the component and the placement information generated based on the image, e.g., the true state or condition of the component based on one or more features extracted from the representation or image of the component. For example, the placement information may be based on features, attributes, characteristics, or qualities which are extracted from an image of the component, e.g., visual features, physical attributes, marks, tags, text written on the component or any other feature related to the component. Label information may further include set-up information of the component, placement information associated with the component and any irregularity identified based on the correlation or comparison of the set-up information and the information generated based on the image of the component.

In operation 540, a component may be classified to one or more groups based on visual features of the component. Classifying the component to one or more groups or clusters of components is performed by a machine learning algorithm based on similar, identical, equal or substantially equal features, e.g., visual features identified or concluded from an image of the component. A component may be classified to more than one group, and a group is determined by the machine learning algorithm based on analysis of images of components.

In operation 550, components assigned to a first group may be traced, upon a detection of an electronic assembly comprising a deficient component from the first group, and one or more electronic assemblies comprising components from the first group may be identified.

According to some embodiments of the invention, when a deficient electronic component is detected in an electronic assembly, the system may identify or check to which group the component is classified and may allow tracing of other components associated with that group. Tracing components assigned to the same group to which a deficient component is assigned may allow reduction of the extent of a recall by slicing the population of a large unit, e.g., a production lot, into subgroups based on the type of fault in the components.

For example, once an electronic component classified to a first group is determined as a deficient electronic component, other electronic components which are classified to the first group may be traced to allow identification of other electronic assemblies which include components from the first group. Some embodiments of the invention may perform categorizing sub-groups of components within a larger group of components, e.g., within a package, a reel or a tray based on similar features, for example, tampering evidence, defects, solderability issues, leads conditions, shapes, roundness, discoloration, or any other feature. The sub-groups of components may allow tracing of components having similar features.

Some embodiments of the invention may allow identification and detection of subgroups of components within a larger group of components, e.g., detect different lots in a reel. For example, a reel may compose or include components originated from different production lots due to the fact that the components in the reel may be counterfeit or were collected from different authentic reels. In such case, the data and/or lot codes of the components being used may not be known, and, therefore, tracing components from such a mixed reel may be impossible. However, in cases where the components are authentic, but a reel is comprised of multiple lots, a manufacturer required to know what lots are used in each board and may use some embodiments of the invention.

Some embodiments of the invention may employ machine learning algorithms in order to obtain information related to electronic components. The machine learning algorithms may use or deploy one or more levels, types or stages of information acquiring or component detection. For example, three levels of component detection may be used. A first level of component detection may include detection of multiple sources of components in a reel using machine learning homogeneity and authenticity algorithms. The first level of component detection may detect that population of components within a reel is originated from different sources or is a mixed population. Such a detection may be performed by detecting the subtle differences in images of the plurality of components to differentiate between manufacturers and manufacturing locations. Differences may be identified based on images of the components and if it is determined that there is more than one group in a group of components, e.g., in a reel, an alert may be generated.

A second level of component detection may include detection of different lots of the same manufacturer on a reel by detecting different markings on the component. Based on components markings it may be detected or determined that there are components originated from different lots in a reel. The images of the components which may include markings may be analyzed and any change, difference, shift or alteration in the markings on the plurality of component may be detected. The machine learning algorithm may separate the plurality of components into one or more groups based on similarity in their markings. An output of the second level of detection may be a number of groups, each identified by a different or a special or distinguishing marking within a group of components, e.g., a reel. Any number larger than one group may be alerted.

A third level of component detection may include detection of different lot code names in a reel by a dedicated Optical Character Recognition (OCR) tool which may be especially tunned for detecting text on the markings of the components, thus resulting in assigning each individual component with its date and lot codes as they appear coded on the component markings. The lots detection may be utilized by any machine that images the component markings. For example, a reel-to-reel inspection machine, SMT pick-and-place vision system (top and/or bottom view), automatic optical inspection (AOI) machine, or post assembly inspection system.

Conventional OCR methods may not be suitable for detection of text printed on components due to the fact that the text may be silk printed, laser engrave, casted or printed in other special technique dedicated for marking on electronic components. For example, the text may be printed in black ink on black substrate and therefore may be obscured, the text may be coded or printed in a unique font. Some embodiments of the invention may utilize a machine learning algorithm to specifically detect markings on electronic components by using models specific to the component packaging type and manufacturers based on previous knowledge. The OCR algorithm may learn the text features specific to each component packaging type and manufacturer site or any other special characteristics of the markings on the component. The OCR algorithm may be trained by detecting a plurality of components having the special characteristics. Therefore, the markings detection may be tailored for specific characteristics and may be performed with high accuracy. The method may be utilized by any system that images the markings on electronic components.

According to some embodiments of the invention, the second level of component detection algorithm may search for homogeneity of the markings in a first group of components, e.g., reel or a part of the reel. The first group may be separated to one or more subgroups using an unsupervised machine learning algorithm, e.g., based on k-means. The markings features may be extracted using the last few layers of a classification model, e.g., by the third level of component detection algorithm for each type of component packaging. The last layers of the classification model or neural network may adept in detecting subtle changes in markings of the components and may create an effective feature map of each component. The feature map may then be reduced in order and separated to clusters by for example, using k-means algorithm. The output of the second level of component detection may be for example, a separation of a reel into clusters of components based on their markings within the reel.

According to some embodiments of the invention, the third level of component detection algorithm may detect and decipher the markings on a component by utilizing a deep convolutional neural network for classification of markings on the component to text. A neural network may be trained for each type of component package and a manufacturer where the classes may include a representation of each symbol on the component surface. The neural network may be trained using a tagging process of the components, the homogeneity unsupervised algorithm of the second level of detection and optionally the assistance of an operator.

In some embodiments of the invention, images of the components, e.g., from a reel may be analyzed by the unsupervised homogeneity algorithm, e.g., the second level detection algorithm to assure that only one cluster or group of component markings exist in the reel. An enhancement process may be performed to improve the legibility of the markings. The first version of an OCR algorithm may be used to decipher the markings and may be approved, e.g., by a processor or by an operator. After approval, the images of components in the reel may be tagged with the approved markings text. The new data may be then entered into the training dataset and a new model may be created with the improved detection. This process may continue until a satisfactory accuracy is obtained. This level algorithm accuracy is increasing with every new scanned reel.

In some embodiments of the invention, post OCR analysis may be performed. For example, after detection of the markings on the components in the reel the date-code and lot code may be extracted and saved in a database. This data may be further used for tracing the components. Additionally, the analysis may estimate the condition of the soldering leads or balls to be used to assess and grade the reliability of the solder joints. This information may be used as reliability or quality groups. The groups may be used to single out or group only components that are suspect to cause quality or reliability concerns in the product. This may reduce the extent of a recall to only components that exhibited a low score of solderability concerns.

Figure 6:
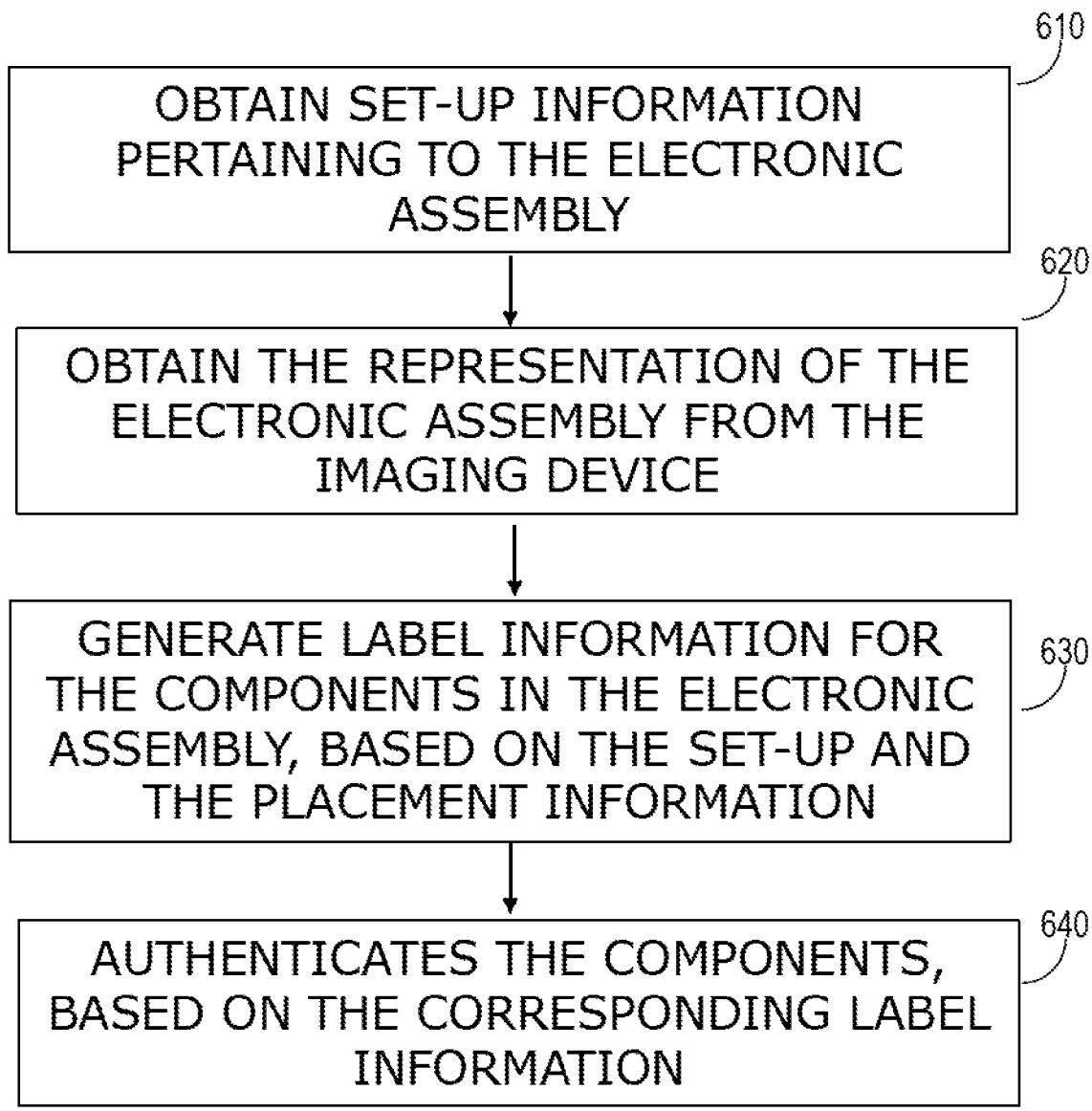
FIG. 6 is a flowchart of a method for automated tracing electronic components of an electronic assembly, according to some embodiments of the invention.

FIG. 6 is a flowchart of a method for automated tracing electronic components of an electronic assembly, according to some embodiments of the invention. Some of the operations of FIG. 6 may be related or may be similar, analogues and/or may match operations performed, for example, by the system shown in FIG. 1 and FIG. 2. As with other method flowcharts, operations of FIG. 6 may be used with operations in other flowcharts shown herein in some embodiments of the invention.

In operation 610 a set-up information pertaining to the electronic assembly may be obtained, e.g., by a processor. The processor may be for example, processor 104 of FIG. 1. For example, a non-transitory computer-readable medium may include instructions executable by a processing resource to trace components of an electronic assembly.

In operation 620, a representation of the of the electronic assembly may be obtained or received from an imaging system, imaging device or a processing unit coupled to an imaging system. The component may be an electronic component. The imaging system may include an imaging device which may be arranged to capture a representation of the electronic assembly and/or to capture a representation of each of the electronic components included in the electronic assembly. The representation of the electronic assembly is not limited to a single direction or and may be from any direction, side, angel, or point of view, e.g., from top or bottom of the component. The representation of the electronic assembly may prescribe a placement information pertaining to the electronic assembly. According to some embodiments of the invention, representation of an electronic assembly may include a representation of the components and source feeder corresponding to the components.

In operation 630, label information for the components in the electronic assembly may be generated based on the set-up and the placement information.

In operation 640, the components in the electronic assembly may be authenticated based on the corresponding label information. According to some embodiments of the invention, an as-made report for the electronic assembly may be generated, for example by a processor. The as-made report may include true logistical information corresponding to the components of the electronic assembly. The as-made report for the electronic assembly may include at least one of: the representation, representation of the components, a Bill of Material (BOM), the set-up information, the placement information, authentication library information, and/or the label information. The as-made report may contain images of the components taken during assembly. In some embodiments, the as-made report may be presented in a way to display the programed location and orientation on the PCB as to simulate the exact placement of the board.

In an example, the as-made report comprises information pertaining to tracing of the components of the electronic assembly. The information collected may include data from the production machines, setup of the production machines, operational mode, production recipe, pick-up and placement parameters, e.g., force, vacuum, accuracy, and other production information that may allow singling out causes for failures in the product.

Some embodiments of the invention may employ an artificial intelligence module operated by a processor, e.g., processor 104 of FIG. 1, for tracing components of the electronic assembly. For example, a non-transitory computer-readable medium may include instructions executable by a processing resource which may employ artificial intelligence module. In addition to authenticating the components based on the corresponding label information, a processor may assess tampering and/or physical condition of the components of the electronic assembly for authentication thereof.

Figure 7:
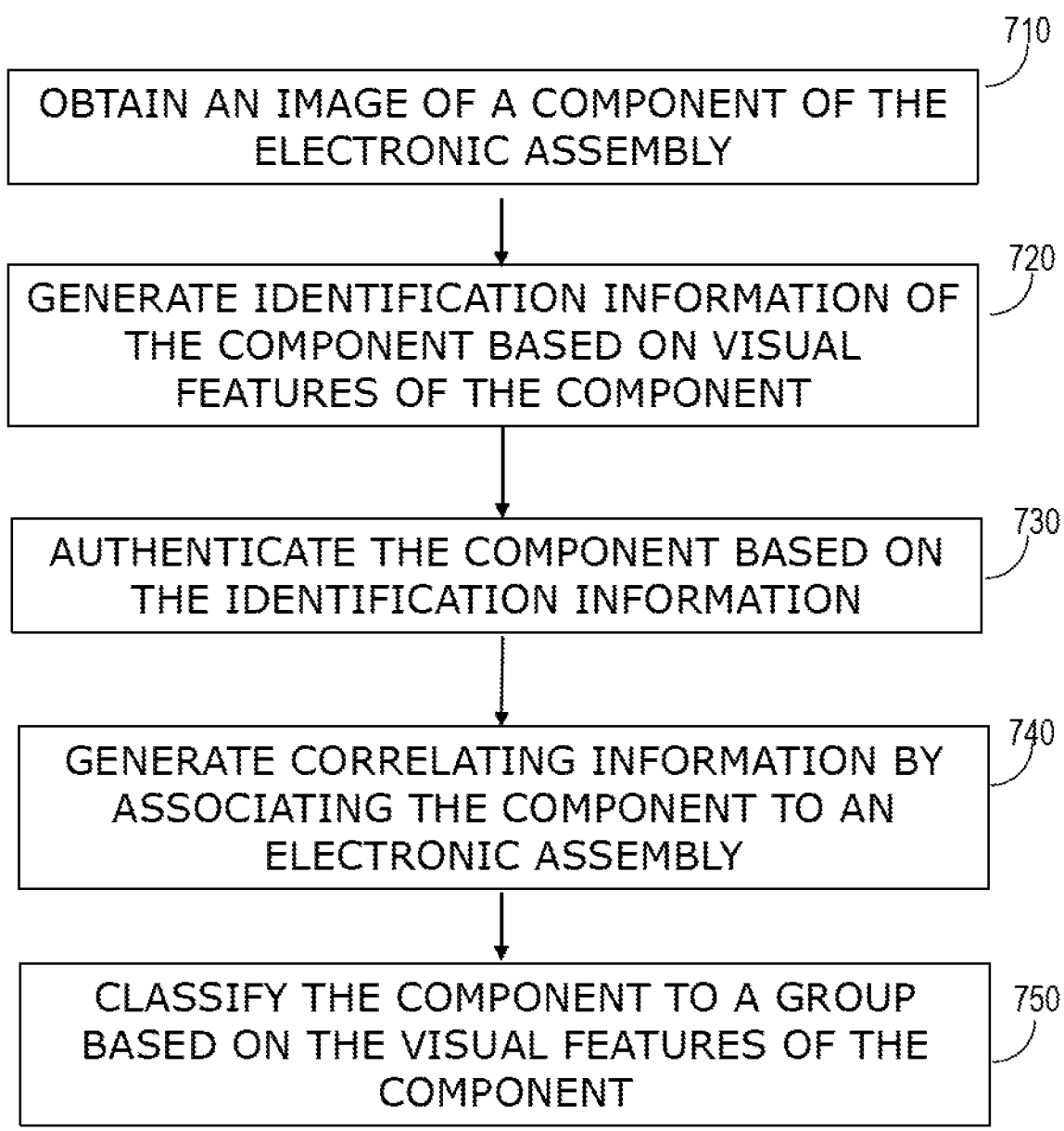
FIG. 7 is a flowchart of a method for automated tracing electronic components of an electronic assembly, according to some embodiments of the invention.

FIG. 7 is a flowchart of a method for automated tracing electronic components of an electronic assembly, according to some embodiments of the invention. Some of the operations of FIG. 6 may be related or may be similar, analogues and/or may match operations performed, for example, by the system shown in FIG. 1 and FIG. 2. As with other method flowcharts, operations of FIG. 7 may be used with operations in other flowcharts shown herein in some embodiment of the invention.

In operation 710, an image of a component of the electronic assembly may be obtained or received from an imaging system, or an imaging device, e.g., from imaging system 102 of FIG. 1. The image of the electronic may be taken from a single direction and/or multiple directions. The image may show any direction, side, angel, or point of view with relation to the component, e.g., from top or bottom of the component.

In operation 720, identification information of the component may be generated based on visual features of the component. The identification information may include any information or knowledge which is based on features, attributes, characteristics, or qualities which are extracted, learned or obtained from the image of the component, e.g., visual features, physical attributes, marks, tags, text written on components or any other feature related to the true state or condition component. For example, the identification information may include information such as type of the component, name of the manufacturer, date of manufacturing, size of the component, or any other characteristics obtained based on the image of the component.

In operation 730, the component may be authenticated based on the identification information. The authentication is based on the true state of the component, as it may be concluded from an image of the exact component which may be placed on the electronic assembly leading to a maximal level of authenticity. The identification information may be compared with set-up information pertaining to the component.

In operation 740, correlating information may be generated by associating the component to an electronic assembly. For example, the correlating information may include the link or association between the component and the electronic assembly it is mounted on. The correlating information may be used for tracing the component. According to some embodiments of the invention, the identification information and/or the correlating information may be compared with set-up information pertaining to the component. If the set-up information is different from one of the identification information and the correlating information, an alert may be generated in order to actively inform regarding a mismatch between the set-up information and the identification information or between the set-up information and the correlating information.

In operation 750, the component may be classified to a group based on visual features of the component. A component may be classified into one or more groups based on visual features of the component. Classifying the component into one or more groups or clusters of components is performed by a machine learning algorithm based on similar, identical, equal or substantially equal features, e.g., visual features identified or concluded from an image of the component. The visual features may include but are not limited to, discoloration, edge shapes, roughness, or any other visual property of the component.

In some embodiments of the invention, upon a detection of an electronic assembly comprising a deficient component assigned to a specific group, all components assigned to that specific group may be traced based on the classification to groups. When all components assigned to that specific group are traced, one or more electronic assemblies comprising components from the specific group may be identified based on the correlating information. Identifying the electronic assemblies which include the component assigned to the specific group may allow to reduce an extent of a recall of electronic assemblies.

Figure 8:
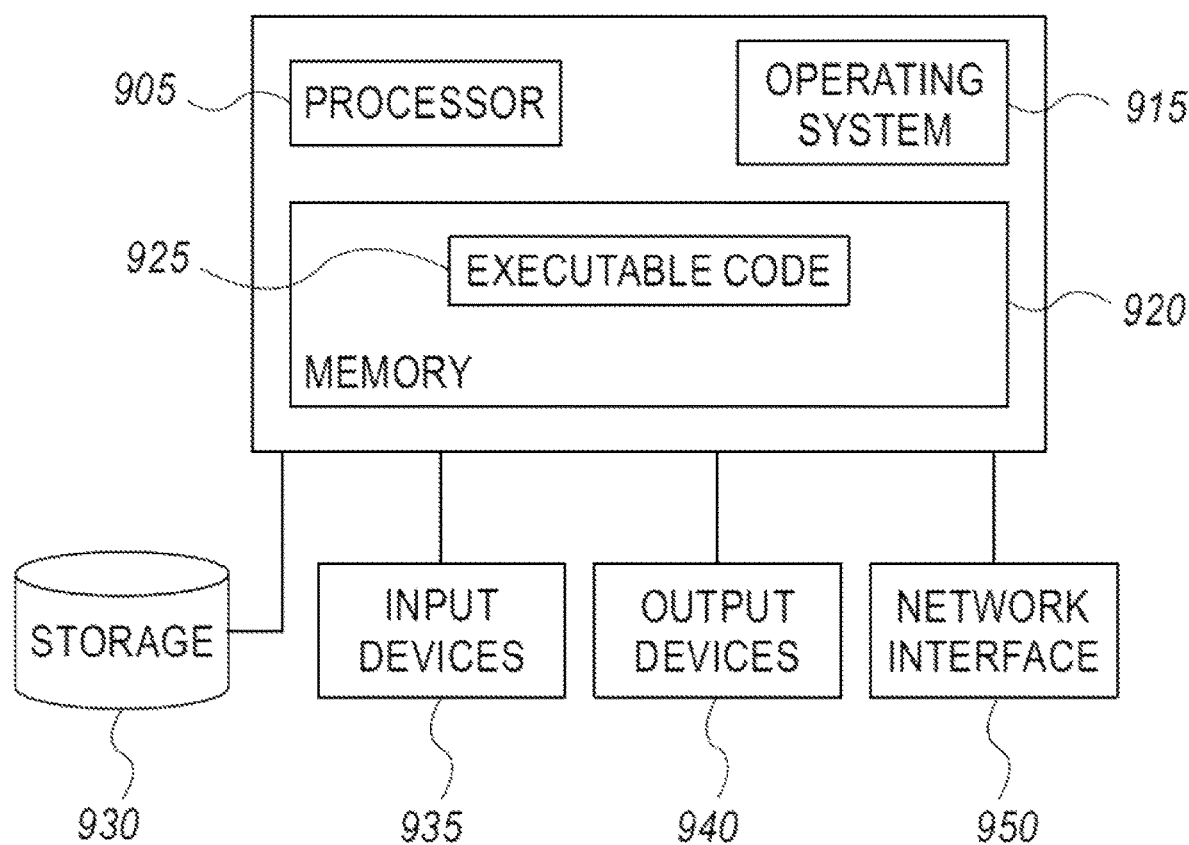
FIG. 8 illustrates an exemplary computing device, according to an embodiment of the invention.

FIG. 8 illustrates an exemplary computing device according to an embodiment of the invention. For example, a computing device 900 with a processor 905 may be used to identify and trace components of electronic assemblies, to employ one or more machine learning algorithms and/or a classification network and to classify electronic components based on one or more features, attributes or characteristics of the electronic components. For example, computing device 900 may be for example, system 100, system 200 and/or any of processor 104, imaging system 102, and/or database 220.

Computing device 900 may include a processor 915 that may be, for example, a central processing unit processor (CPU), a GPU, a chip or any suitable computing or computational device, an operating system 915, a memory 920, a storage 930, input devices 935 and output devices 940. Processor 905 may be or include one or more processors, etc., co-located or distributed. Computing device 900 may be for example a smart device, a smartphone, workstation or a personal computer, a laptop, or may be at least partially implemented by one or more remote servers (e.g., in the "cloud").

Operating system 915 may be or may include any code segment designed and/or configured to perform tasks involving coordination, scheduling, arbitration, supervising, controlling or otherwise managing operation of computing device 900, for example. Operating system 915 may be a commercial operating system. Memory 920 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 920 may be or may include a plurality of possibly different memory units.

Executable code 925 may be any executable code, e.g., an application, a program, a process, task or script. Executable code 925 may be executed by processor 905 possibly under control of operating system 915. For example, executable code 925 may be or include code for encoding one or more digital images, according to embodiments of the invention.

Storage 930 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 9 may be omitted. For example, memory 920 may be a non-volatile memory having the storage capacity of storage 930. Accordingly, although shown as a separate component, storage 30 may be embedded or included in memory 920. Storage 930 and or memory 920 may be configured to store any information related to a plurality of items, products and to a plurality of securing devices or any other information required for performing embodiments of the invention.

Input devices 935 may be or may include a camera, a mouse, a keyboard, a touch screen or pad or any suitable input device. It will be recognized that any suitable number of input devices may be operatively connected to computing device 900 as shown by block 935. Output devices 940 may include one or more displays, speakers and/or any other suitable output devices. It will be recognized that any suitable number of output devices may be operatively connected to computing device 900 as shown by block 940. Any applicable input/output (I/O) devices may be connected to computing device 900 as shown by blocks 935 and 940. For example, a wired or wireless network interface card (NIC), a modem, printer or facsimile machine, a universal serial bus (USB) device or external hard drive may be included in input devices 935 and/or output devices 940. Network interface 950 may enable device 900 to communicate with one or more other computers or networks. For example, network interface 950 may include a Wi-Fi or Bluetooth device or connection, a connection to an intranet or the internet, an antenna etc.

Some embodiments described in this disclosure may include the use of a special purpose or general-purpose computer including various computer hardware or software modules, as discussed in greater detail below.

Some embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method of monitoring quality of an electronic assembly comprising a plurality of electronic components, the method comprising:

acquiring at least one image of an electronic assembly during a process of assembling a plurality of electronic components to the electronic assembly;

acquiring at least two images of an electronic component of the plurality of electronic components in real-time during the assembling process;

processing the at least one image of the electronic assembly and the at least two images of the electronic component in real time during the assembling process to identify physical features of the electronic component and determine a true state of the component comprising data based on the identified physical features;

acquiring set-up information for the electronic component that characterizes logistical information associated with the electronic component, vetting consistency of the true state and set-up information in real-time;

undertaking an action to mitigate damage to the assembling process if the vetting fails.

2. The method according to claim 1 wherein performing the method in real time comprises performing the method during a time period between a pick time and a place time in an SMT pick and place system.

3. The method according to claim 1 wherein processing the image of the electronic assembly comprises determining an identification (ID) of the electronic assembly.

4. The method according to claim 1 wherein processing the image of the electronic assembly and the at least two images comprises determining a true mounting location of the component in the electronic assembly.

5. The method according to claim 1 wherein processing the at least two images of the electronic component to identify the physical features comprises determining absence or presence of a defect in the component.

6. The method according to claim 5 wherein if the defect is present providing true state data comprises classifying the component to a class of components responsive to a type of the defect.

7. The method according to claim 1 wherein undertaking an action comprises preventing assembly of the component in the electronic assembly.

8. The method according to claim 1 and comprising providing traceability data for the component based on the true state data and the set-up data.

9. The method according to claim 8 wherein providing traceability data comprises acquiring data characterizing operating parameters of the assembling process.

10. The method according to claim 9 wherein the data characterizing the assembling process comprises data defining setup of assembling process production machines, their operational modes, and production recipes.

11. The method according to claim 10 wherein the assembling process production machines comprise at least one pick and place machine.

12. The method according to claim 11 wherein the data characterizing the assembling process comprises at least one pick and place parameter characterizing operation of the pick and place machine.

13. The method according to claim 12 wherein the parameters characterizing operation of the pick and place machine comprise force, vacuum, and/or accuracy characterizing operation of the pick and place machine.

14. A system for monitoring quality of an electronic assembly comprising a plurality of electronic components, the system comprising:

at least one imaging device operable to acquire an image of an electronic assembly during a process of assembling a plurality of electronic components to the electronic assembly;

at least one imaging device operable to acquire at least two images of an electronic component of the plurality of electronic components in real-time during the assembling process;

at least one computing system comprising data and computer executable code for performing the method of claim 1 in real time.

15. A method of monitoring quality of an electronic assembly comprising a plurality of electronic components, the method comprising:

acquiring at least one image of an electronic assembly during a process of assembling a plurality of electronic components to the electronic assembly;

acquiring at least two images of an electronic component of the plurality of electronic components in real-time during the assembling process;

processing the at least one image of the electronic assembly and the at least two images of the electronic component in real time during the assembling process to identify physical features of the electronic component and determine a true state of the component comprising data based on the identified physical features;

acquiring set-up information for the electronic component that characterizes logistical information associated with the electronic component, vetting consistency of the true state and set-up information in real-time;

undertaking an action to mitigate damage to the assembling process if the vetting fails; and providing traceability data for the component based on the true state data and the set-up data and data characterizing operating parameters of the assembling process that defines setup of assembling process production machines, their operational modes, and production recipes.

16. The method according to claim 15 wherein the assembling process production machines comprise at least one pick and place machine.

17. The method according to claim 16 wherein the data characterizing the assembling process comprises at least one pick and place parameter characterizing operation of the pick and place machine.

18. The method according to claim 17 wherein the parameters characterizing operation of the pick and place machine comprise force, vacuum, and/or accuracy characterizing operation of the pick and place machine.

\* \* \* \* \*